United States Patent [19]

Burkhart

[11] 4,164,138
[45] Aug. 14, 1979

[54] HIGH SENSITIVITY GAS LEAK DETECTION SYSTEM

[75] Inventor: William H. Burkhart, Los Altos, Calif.

[73] Assignee: Smith & Denison, Los Altos, Calif.

[21] Appl. No.: 845,954

[22] Filed: Oct. 27, 1977

[51] Int. Cl.² ............................................. G01N 31/00
[52] U.S. Cl. ..................................... 73/23; 73/40.5 R
[58] Field of Search ................ 73/40.7, 40, 23, 40.5 R

[56] References Cited

U.S. PATENT DOCUMENTS

| | | | |
|---|---|---|---|
| 2,879,663 | 3/1959 | Thomas | 73/23 UX |
| 3,333,458 | 8/1967 | Heath et al. | 73/23 |
| 3,420,091 | 1/1969 | Franklin | 73/23 |
| 3,444,721 | 5/1969 | Hearn et al. | 73/23 |

*Primary Examiner*—Jerry W. Myracle
*Attorney, Agent, or Firm*—Poms, Smith, Lande & Rose

[57] ABSTRACT

A gas leak detection system is provided which includes a large number of small diameter flexible tubes which are mounted in alignment and which extend down close to the surface of the earth or the street where the gas leak is to be detected. The total internal volume of the system is kept to a minimum by using very small diameter tubes and minimizing the volume included in the system. Preferably the total volume in the system is less than 100 cubic centimeters. This provides for a response time of three seconds or less with the small portable ionization type gas detectors which are commercially available. Manifold arrangements are provided which give equal length trasmission paths from all of the sampling tubes. A counterweighted boom is employed to sense leaks beyond the curb adjacent the street where the vehicle is travelling. The manifold may be made of an elongated member of plastic, aluminum, or the like, with the gas passages being in the form of grooves in the surface of the elongated member, which are subsequently transformed into gas passageways by the addition of a cover sheet. The depending flexible tubes may be made of Teflon, and preferably have their ends cut off at an acute angle so that water droplets will not block the central gas passageway.

21 Claims, 8 Drawing Figures

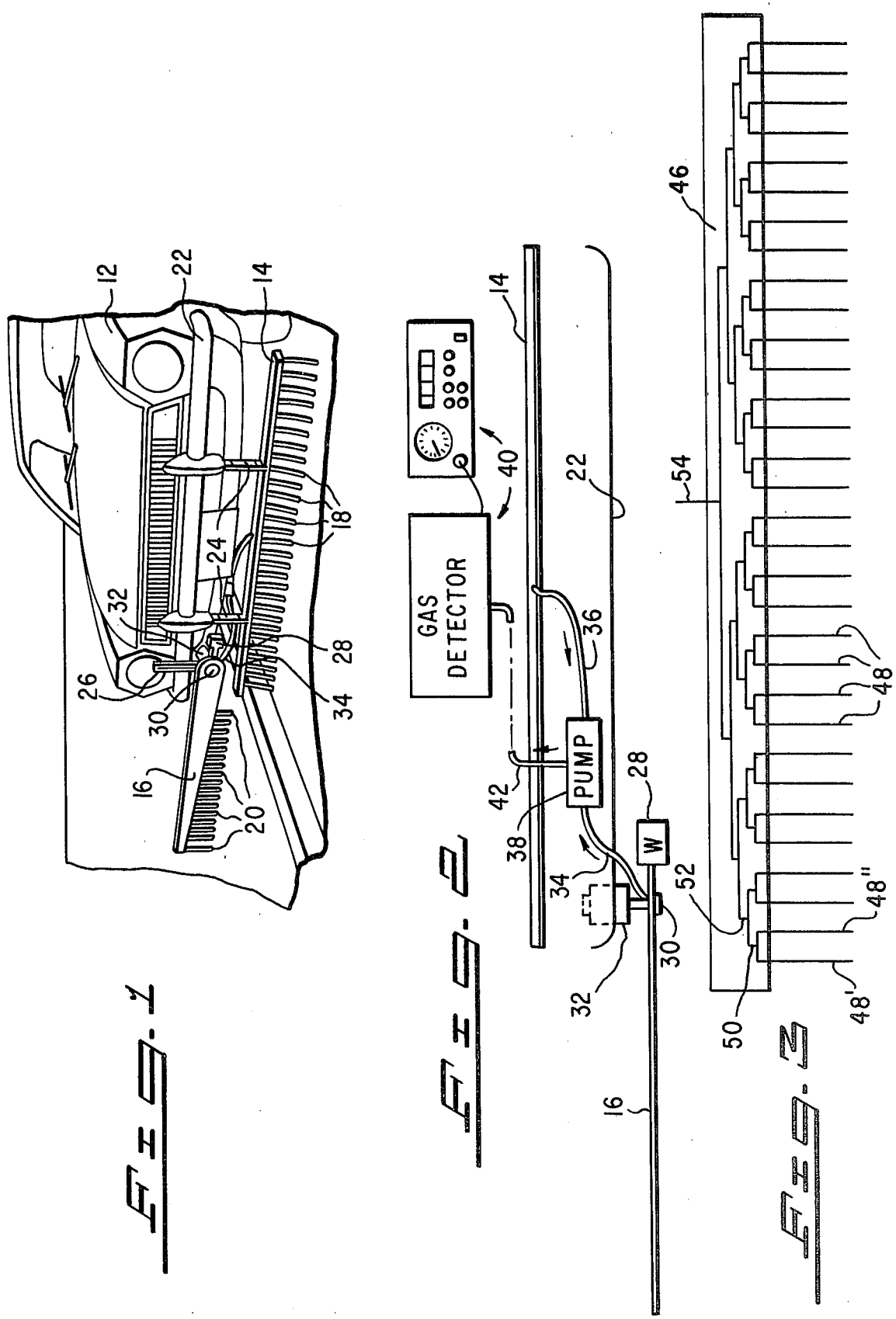

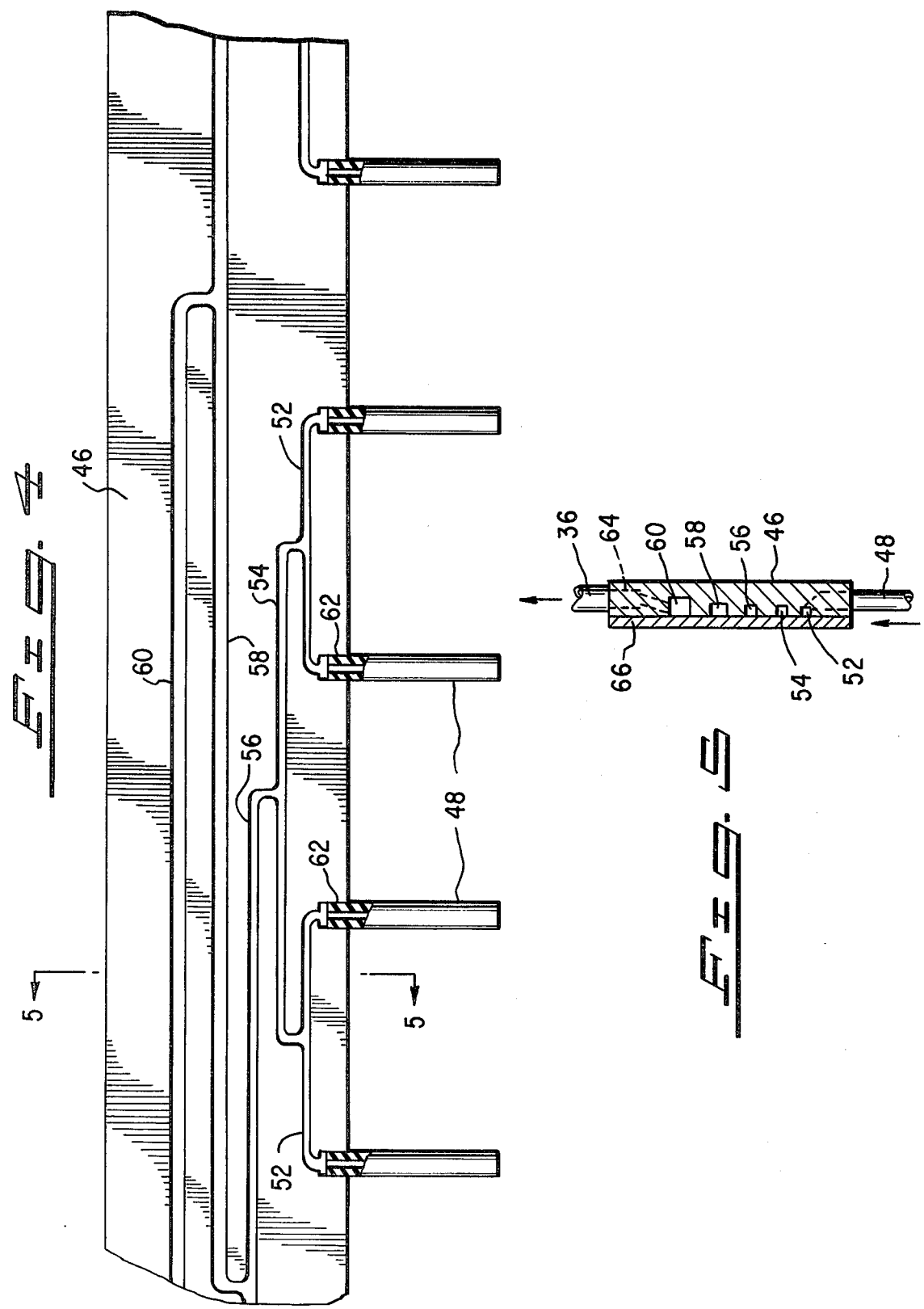

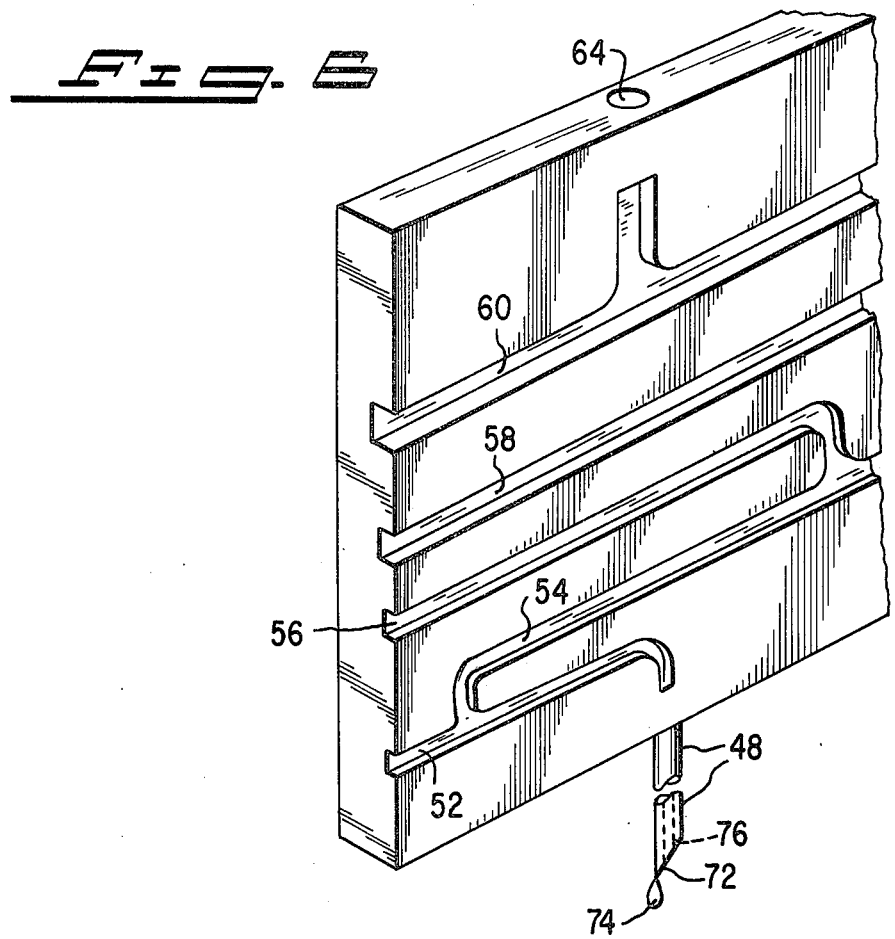
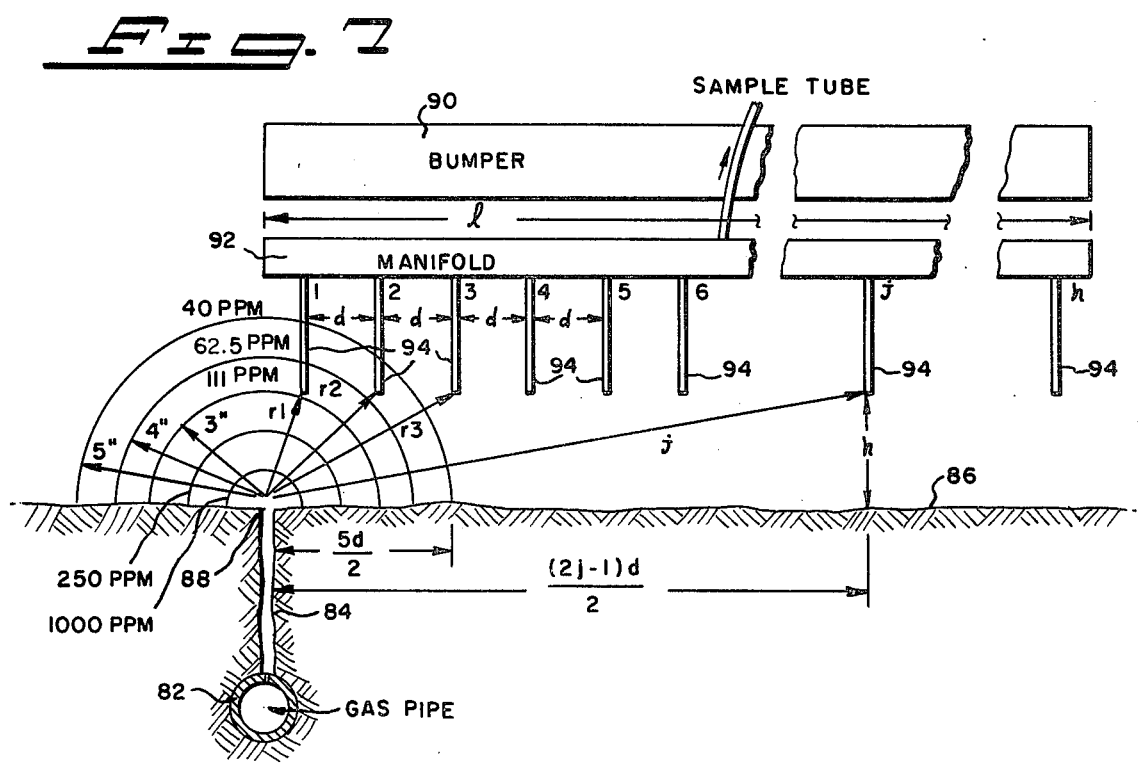

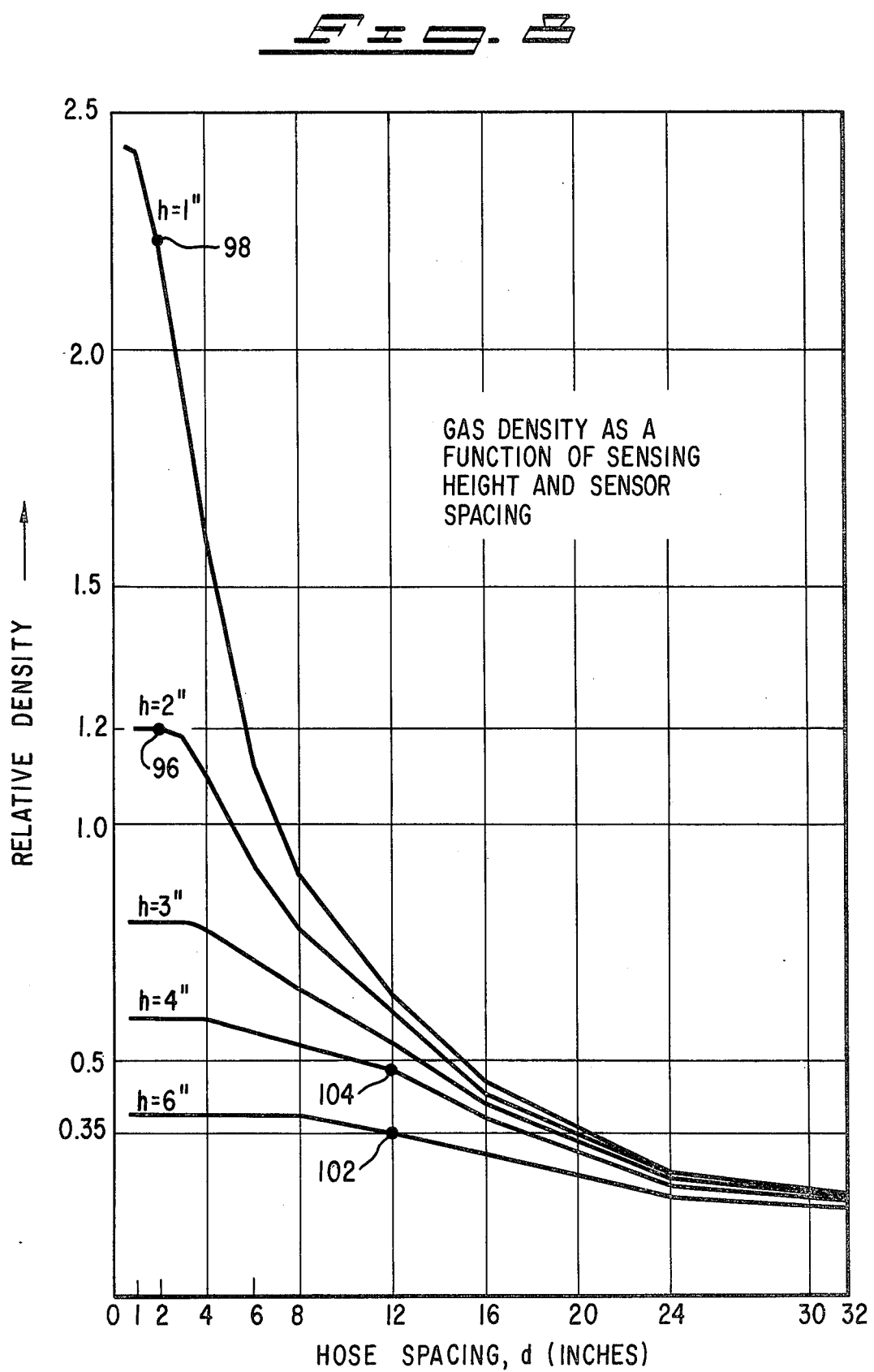

HIGH SENSITIVITY GAS LEAK DETECTION SYSTEM

FIELD OF THE INVENTION

This invention relates to gas leak detection systems.

BACKGROUND OF THE INVENTION

Up to the present time, gas leak detection systems have been relatively heavy and cumbersome and are normally mounted on special vans outfitted with the several hundred pounds of equipment which are normally employed. Many of the conventional systems include one or more large inverted funnels, with conduits which are frequently in the order of 2 inches in diameter leading back toward the gas detection equipment. Representative systems of this type include E. R. Lloyd, et al, U.S. Pat. No. 3,107,517, granted Oct. 22, 1963; C. A Heath, U.S. Pat. No. 3,364,727, granted Jan. 23, 1968; M. C. Kelsey, et al, U.S. Pat. No. 3,416,357, granted Dec. 17, 1968; and D. P. Hearn et al, U.S. Pat. No. 3,444,721, granted May 20, 1969. Because of the large volume of air included in the system, it is conventional in these systems to use large volume heavy duty centrifugal fans to pull the air in the funnels and the large diameter tubes. However, the gas analyzing apparatus is normally of relatively small gas handling capacity, and cannot use the entire volume of air which is drawn through the system. Accordingly, only a small sample of the gas is routed to the gas analyzer, with resultant significant decrease in the density of the gas which is being detected in parts per million. Also, the funnels through which the air is drawn are large and rigid; accordingly, they normally cannot be located close to the ground, as such a location would cause damage to these input funnels when road irregularities are encountered. Incidentally, the funnel shaped intake arrangements appear to be predicated on the concept that leaking gas, like smoke, rises. Instead, the diffusion and effect of wind are substantially greater than the tendency of the gas to rise and therefore the funnel shaped detectors located a foot or so above the ground are much less effective than may be anticipated.

A collateral disadvantage of the systems which have been used heretofore is their excessive weight. With a weight of 200 pounds or more, it is impractical to transport the equipment as carry-on luggage on a commercial airplane flight. Accordingly, the truck on which the equipment is normally mounted is restricted in its usage to handling the heavy detection gas equipment, and correspondingly the gas detection equipment may not be readily transported extended distances and quickly mounted on a rented car or other vehicle normally used for other purposes.

An important object of the present invention is to increase the sensitivity of gas leak detection apparatus.

A subordinate object of the present invention is to provide a lightweight portable gas leak detection system which may be easily hand carried and rapidly attached to a rented car, for example, for use in a city distant from the base location of the equipment.

SUMMARY OF THE INVENTION

In accordance with the present invention, a portable high sensitivity gas leak detection system includes a series of aligned flexible tubes, including arrangements for mounting the tubes to pick up gas samples from close to the ground.

In accordance with an important feature of the invention, substantially all of air which is picked up is routed to the gas analyzer, and the total capacity of the system for bringing the air from the tubes to the analyzing point is less than 100 cubic centimeters, so that the response time of the instrument is less than 3 seconds, and a high level of concentration of the gas is provided at the analyzing point.

In accordance with additional aspects of the invention, the tubes may be made of flexible plastic, and more specifically, may be made of fluoroplastic; they should have an inside diameter of less than ¼", and preferably about 1/16", and their lower ends should be cut off at a sharp angle so that droplets of water will not block the intake of gas samples.

A collateral feature of the invention includes the use of a boom which is intended to extend from the vehicle laterally to detect leaks in the curb or sidewalk area adjacent a street. The boom is preferably counterbalanced, and has a gas sample tube extending from it near the pivot point of the counterbalanced boom. The boom may be made of flexible plastic material strengthened with fiber glass.

A large number of inlet tubes should be employed, as compared with the four or six high elevation inverted funnels which have been previously employed. More specifically, at least 10 or 12 tubes are advantageously employed and larger numbers such as 16 or 32 or more tubes may be employed to provide increased sensitivity and accuracy of results.

It is a particular feature of the invention that the bumper manifold weighs less than 15 pounds, and preferably less than 10 pounds, and the entire system weighs less than 35 pounds.

The manifold arrangements preferably provide equal path lengths from the pickup points to the gas analyzer for each of the samples of air or gas which are brought into the system.

A collateral aspect of the invention involves the use of low capacity diaphragm-type suction pumps to avoid unduly increasing the internal capacity of the system and delaying the response time.

In accordance with a further feature of the invention, the manifold arrangements may include an elongated member of aluminum, plastic, or the like, with holes drilled along its lower edge for receiving the depending tubes and one face grooved to provide channels for manifolding the input air samples. The grooves are turned into gas channels by the addition of a plate on the face of the elongated member closing all the channels.

It is a particular feature of the apparatus of the present invention that the size and weight of the gas analyzing system is greatly reduced as compared with the previously proposed systems, and despite such great reduction in size and weight, the density of the gas samples received by the analyzing unit in parts per million of the gas being detected, is greatly increased, as quantitatively developed below.

Other objects, features, and advantages of the invention will become apparent from a consideration of the following detailed description and from the accompanying drawing.

BRIEF DESCRIPTION OF THE DRAWINGS

FIG. 1 is a front view of a vehicle showing an illustrative gas detection system in accordance with the present invention;

FIG. 2 is a schematic top view of the system shown in FIG. 1;

FIG. 3 is a diagrammatic showing of manifolding arrangements for interconnecting the sampling tubes of the present system;

FIGS. 4, 5, and 6 are different views of one form of manifolding arrangements which may be employed in the implementation of the present invention; and FIG. 7 is a diagram employed in connection with a mathematical analysis of the present system; and FIG. 8 is a plot of the density in parts per million which is obtained with various spacings of input hoses at various levels off the ground.

DETAILED DESCRIPTION

Before going into the detailed construction or the mathematics, a few general statements of principles which are involved are in order.

First, the response time of the system is most important. Thus, if a vehicle is moving at 3 miles per hour, this is equivalent to 4.4 feet per second. A 5 second response time is approximately equal to 22 feet, or about the length of the vehicle. Accordingly, any response time less than 5 seconds will permit the vehicle to travel more rapidly, without having to back up to get to a leak. Similarly, longer times of response would require that the vehicle back up and otherwise lose time and perhaps interfere with traffic.

An interrelated factor is that commercially available sensing instruments burn about 1.5 liters per minute of air. This is only 25 cubic centimeters per second. If a big blower is employed to bring in a large sample and move it to the instrument quickly, then the instrument can only bring in a small fraction of the air, with consequent dilution of the sample. Similarly, if all the air which is brought in is being routed to the analyzing instrument, a 5 second response time means that you should not have more than 125 cubic centimeters of air in the entire system. Accordingly, for high concentration analysis and low response time it has been determined that the entire capacity of the system should be less than 100 cubic centimeters. In this way the response time is held to less than 4 seconds.

As will be developed below, in addition to keeping the volume of the system at a minimum, and using all of the air which is transmitted through the system for analysis purposes, it has been determined that greatly increasing the number of sampling points, and greatly reducing the spacing between sampling points serves to increase the gas density and the corresponding sensitivity of the sampling equipment.

Now, turning to a detailed consideration of the drawings, FIG. 1 shows a vehicle 12 equipped with a gas leak detection system illustrating the principles of the invention, and including a manifold 14 and a boom 16. A first set of fluoroplastic sensing tubes 18 are shown depending from the manifold support structure 14, and a second set of depending plastic sensing tubes 20 are shown hanging down from the boom 16 which of course also includes a manifolding structure for bringing the gas samples together. The manifold support structure 14 is secured to the bumper 22 of the vehicle 12 by the clamps 24. The boom 16 is mounted by bracket 26 to the bumper 22, and the boom is counterbalanced by the counterweight 28. The boom may be rotated about its mounting and pivot point 30 by a motor 32 which is behind the pivot point 30. The output from the sensing tubes 20 on the boom is taken off through flexible tube 34 at a point near the pivot point 30 so that the boom may be raised and lowered by the motor 32 without interfering with the gas flow or interrupting the connection.

As shown in FIG. 2 which is a schematic top view of the bumper, boom, and manifold as shown in FIG. 1, the flexible output tube 36 from manifold 14, and the flexible output 34 from the boom sensors are connected to a pump 38. This pump 38 is connected to conventional gas detection apparatus 40 by a flexible tube 42. The pump 38 is preferably of the diaphragm suction type, so that it has low internal capacity or volume which, as noted above, would form part of the internal capacity of the system and affect the time constant of the unit.

Concerning the manifolding of the input sensors, it is desirable that the path length from all of the sensors to the gas analyzer is the same, so that input gas samples combine to give a meaningful total output reading at the gas detector instrument 40. One arrangement for achieving this constant length result is shown in the binary manifolding arrangements 46 of FIG. 3. In FIG. 3 the flexible plastic sampling tubes 48 are connected together in a so-called binary manifold arrangement. More specifically, the first two tubes 48' and 48" are connected together at point 50, and the second pair of sampling tubes are also connected together and joined to the first pair at channel 52. Similarly, all of the other sampling tubes are connected together in pairs, and then 4, 8, and 16 sampling tubes are connected together until the resultant output of the entire array of 32 tubes are connected to the output conduit represented by the line 54. As successive tubes are connected together, the size of the manifold channels increase to connect the larger volumes of air which must be directed from the greater number of input tubes 48 which are being sampled. From the initial sampling tubes, which are 1/16th inch in internal diameter, the size of the channels comes progessively larger until the output tube 54 from the manifold 46 has an internal diameter or I.D. of approximately ⅛th of an inch. In FIGS. 4, 5 and 6 the successive channels in the manifold member 46 running from the lowest level to the top are designated by the reference numerals 52, 54, 56, 58 and 60. Each horizontal is slightly larger than the one below it, with the lowermost slots being approximately 1/20th of an inch, or 0.06 inches square while the uppermost slot 60 is approximately 1/10th or 0.1 inch square. The input tubes 48 and the output tube 36 may be secured to the manifold assembly by drilled holes as indicated at 62, for example, for the flexible plastic sensing tubes 48, and at 64 for the output tube 36. The cover plate 66 may be secured on the groove face of manifold member 46 to seal the face and to form air transmitting passageways from the open slots 52, 54, 56, 58, and 60.

In FIG. 6, an interesting feature of the pickup tubes 48 is shown. More specifically, the lower end 72 of the tube 48 is cut away at an acute angle so that droplets of water such as that shown by reference numeral 74 merely form and drop off of a point on one side of the central aperture 76 and do not prevent the free flow of gas being picked up by the sensing tube 48.

A mathematical analysis will now be undertaken, with particular reference to FIGS. 7 and 8. In FIG. 7, a leaky gas pipe is shown at 82 and the leak vent is shown at 84 with the opening in the street surface 86 occurring at point 88. It will be assumed for the purpose of the present analysis that the opening 88 is located precisely under one end of the bumper 90. A manifold 92 is provided with a series of depending sensor tubes 94. For the purposes of the present analysis, the distances $r_1$, $r_2$, $r_3 \ldots r_n$ are the distances from the leak to the ends of the sensing tubes 94 which are numbered 1 through n from left to right. In the following analysis the fact that the gas density at any point is inversely proportional to the square of the distance to the particular point from the leak vent will be employed.

Initially, the distance to the successive sensing points will be developed in the following equations:

$$r_1 = \sqrt{h^2 + (d/2)^2} \quad (1)$$

$$r_2 = \sqrt{h^2 + (3d/2)^2} \quad (2)$$

$$r_3 = \sqrt{h^2 + (5d/2)^2} \quad (3)$$

$$r_j = \sqrt{h^2 + [(2j-1)d/2]^2} \quad (4)$$

However, gas density is proportional to the reciprocal of the square of the distance from the leak to the point of pickup, and is therefore given by the following expression:

$$D = K/r_j^2 \quad (5)$$

Accordingly, the density picked up by the tube j will be:

$$D = \frac{K}{r_j^2} = \frac{K}{h^2 + \left(\frac{(2j-1)d}{2}\right)^2} \quad (6)$$

The manifold has the effect of adding all samples, 1,2,3,...j...n and divides by n (an average). Its output will thus be:

$$D = \frac{k}{n} \sum_{j=1}^{n} \frac{1}{h^2 + \left[\frac{(2j-1)d}{2}\right]^2} \quad (7)$$

where:
K is a constant
n is the number of pickup tubes
h is height of pickup
d is the lateral spacing of the pickup tubes
l = nd = length of whole array The equation of FIG. 7 has been solved numerically for a 64" array of n tubes where $n = 32$, 16, 8, 4, and 2, and where $h = 1$, 2, 3, 4 and 6 inches above the street. The results of these solutions are shown graphically in FIG. 8.

An examination of FIG. 8 shows that gas density in the total sample is much greater as the tubes are lowered, but only if we space the tubes close enough together. In this connection it may be noted that the upper curve in FIG. 8 indicates that the tubes are spaced one inch from the street or the ground. More generally, it may be noted that with any given spacing above the ground, the spacing between tubes or intake sampling members should be less than twice the height of the ends of the sampling tubes above the road.

In practice, good results have been obtained with the ends of the sampling tubes between an inch and two inches from the ground and using 32 sampling tubes spaced 2 inches apart. Particular attention is directed to point 96 which represents a tube spacing of 2 inches and a height of 2 inches above the ground. Similarly, point 98 represents a tube spacing of 2 inches and a height above the ground of 1 inch. These points 96 and 98 should be contrasted with points 102 and 104 which represent heights above the ground of 4 inches and 6 inches with a 1 foot spacing between sampling points.

In systems which have been proposed heretofore, 2 inch diameter pipes have been located at positions generally as indicated at points 102 and 104. However, with a 2 inch pipe, in order to get a reasonable response time, a high speed blower must transmit the samples to the analyzer at a high rate of speed with concurrent dilution at least by a factor of 20 to 1 and more probably by a factor of 100 or 200 to 1. Accordingly, in addition to the fundamental disadvantage as shown by the position of points 102 and 104, with respect to points 96 and 98, the sensitivity of the entire instrument is reduced by an additional factor of 20 or 100. This would make the overall response of the instrument of the present invention in the order of at least 50 times greater sensitivity than prior known units and more probably in the order of 100 to 200 times more sensitive.

Further, as discussed hereinabove, the apparatus of the present invention weighs only about 35 pounds or so as compared with more than 100 pounds of weight characteristic of units which have been made heretofore. Incidentally, the breakdown of the weight of the illustrative embodiment of the invention described hereinabove includes approximately 10 pounds for the flame ionization detector, about 7 pounds for the bumper mounted manifold and pickup tubes, and approximately 15 pounds for the liftable boom assembly, including the motor for raising the boom, and the supplemental diaphragm type pump.

For completeness, it may also be noted that the pump 38 at the bumper is optional. Without pump 38, and with only the normal pump associated with gas detector 40, about 1.5 liters of air (and gas to be analyzed) are moved to the detector 40 for analysis, with a resulting response time of 3 to 4 seconds. With the supplemental pump 38, about 2.5 liters per minute are moved, and the response time is reduced to about two seconds.

It may also be noted that the boom 16 may be made of a thin sheet of fiber glass epoxy resin, which is very strong and flexible. The sheet material itself weighs less than one pound, and is capable of bending back alongside the fender of the car 12 if the operator inadvertently fails to raise it when passing obstacles such as parked cars. These properties of the present boom represent a very significant advance over the heavy, solid booms which have been used heretofore, and which frequently damaged parked vehicles, and were damaged by such vehicles, and other roadside obstacles such as fire plugs and lamp posts.

With regard to the availability of gas detectors, suitable organic vapor analyzers which may advantageously be employed in connection with the disclosed system may be purchased from Century Systems Corporation, P. O. No. 133, Arkansas City, Kan. 67005.

In conclusion, it is to be understood that the present invention may be implemented by other arrangements than the specific embodiment shown in the drawings and described hereinabove. By way of example, and not of limitation, the manifold could be implemented by a series of fluoroplastic or other inert plastic tubes enclosed in a hollow aluminum mounting member, for example, with the lengths of the tubes being arranged to provide substantially the same distance of gas travel from each of the sensing points to the analyzer.

Other similar changes may be made and still be within the scope of the invention, as will be evident to one skilled in the art.

What is claimed is:

1. A portable, high sensitivity gas leak detection system comprising:
    means including at least twelve pendant flexible tubes having their open ends substantially aligned for continuously sampling air close to the surface of the earth;
    a pump for drawing air from said tubes for analysis;
    manifold means for connecting said tubes to said suction pump;
    the total internal capacity of said system to the analysis point, including said pump, manifold means and tubes being less than 100 cubic centimeters; and
    each said flexible tube having an inside diameter less than ¼ inch, and having the opening at its end of substantial vertical extent to avoid gas blockage by water droplets.

2. A portable, high sensitivity gas leak detection system comprising:
    means including at least twelve pendant tubes having their open ends substantially aligned for continuously sampling air close to the surface of the earth;
    means including a pump for drawing air from said tubes for analysis;
    manifold means for connecting said tubes to said pump with substantially equal path lengths from the end of each tube; and
    wherein the total internal capacity of said system to the analysis point including said pump, manifold means, and tubes is less than 125 cubic centimeters.

3. A portable, high sensitivity gas leak detection system as defined in claim 2 further comprising:
    means for mounting said pendant tubes spaced apart from each other substantially equally and at intervals of less than six inches.

4. A portable, high sensitivity gas leak detection system as defined in claim 2 further comprising:
    a low capacity organic vapor analyzer connected to receive substantially all of the gas picked up by all of said tubes.

5. A portable, high sensitivity gas leak detection system as defined in claim 2 wherein said tubes are less than ¼ inch in inside diameter.

6. A portable, high sensitivity gas leak detection system as defined in claim 2 wherein at least 16 tubes are provided.

7. A portable, high sensitivity gas leak detection system as defined in claim 2 wherein said tubes are supported from said manifold, said manifold being substantially equal in length to the length of an automotive bumper, and further comprising:
    means for securing said manifold to the front of an automotive vehicle.

8. A portable, high sensitivity gas leak detection system as defined in claim 2 wherein said pump is a low volume capacity diaphragm type suction pump.

9. A portable, high sensitivity gas leak detection system as defined in claim 2 wherein two pumps are provided, one being located at the output from the manifold and a second being located near the analysis point.

10. A portable, high sensitivity gas leak detection system as defined in claim 2 wherein at least 20 tubes are provided, and further comprising:
    means for supporting said tubes in substantial alignment within four inches of the ground.

11. A portable, high sensitivity gas leak detection system as defined in claim 2 wherein said manifold includes an elongated member, a plurality of recesses in one side of said member in which said tubes are secured, a series of channels in one side of said member for directing gas samples from said tubes to a common point, and a face plate secured to the channeled side of said elongated member for closing the open side of each said member for directing gas samples from said tubes to a common point, and a face plate secured to the channeled side of said elongated member for closing the open side of each said channel to form gas passageways.

12. A portable high sensitivity gas leak detection system as defined in claim 2 wherein the inside diameter of each tube is less than ⅛ inch.

13. A portable, high sensitivity gas leak detection system as defined in claim 2, wherein said tubes are made of fluoroplastic.

14. A portable high sensitivity gas leak detection system as defined in claim 2 wherein two pumps are provided for drawing air from said tubes for analysis, one of said pumps being located adjacent said manifold means, and the other said pump being associated with gas analysis equipment.

15. A portable, high sensitivity gas leak detection system comprising:
    means including a plurality of pendant tubes having their open ends substantially aligned for continuously sampling air close to the surface of the earth, the depending ends of said tubes being provided with an opening at their ends which is angled with respect to the vertical, whereby water droplets will not block gas entry;
    means including a pump for drawing air from said tubes for analysis; and
    manifold means for connecting said tubes to said pump.

16. A portable, high sensitivity gas leak detection system comprising:
    means including a plurality of pendant tubes having their open ends substantially aligned for continously sampling air close to the surface of the earth, said pendant tubes including a first set of tubes and a second set of tubes;
    means for supporting said first set of tubes to extend across the front of an automotive vehicle;
    boom means supported from said vehicle for carrying said second set of tubes to extend laterally from said vehicle in general alignment with said first set of tubes;
    means for shifting the position of said boom so that it does not extend significantly beyond the side of said vehicle, whereby the analyzing system may check for leaks over an extended path with the boom extended, but may avoid damage to the boom from obstructions such as hydrants, parked cars or the like by retracting the boom;
    means including a pump for drawing air from said tubes for analysis; and manifold means for connecting said tubes to said pump.

17. A portable, high sensitivity gas leak detection system as defined in claim 16 further comprising:
a counterweight secured to the inner end of said boom; and
pivot means for mounting said boom to rotate substantially about its center of mass.

18. A portable, high sensitivity gas leak detection system as defined in claim 17 further comprising:
means for receiving gas samples from said movable boom including a gas conduit connected to said boom near said pivot means.

19. A portable, high sensitivity gas leak detection system as defined in claim 16 wherein the total weight of said system is less than thirty-five pounds.

20. A system as defined in claim 16 wherein said boom is made of very thin, strong, flexible lightweight plastic material, whereby little or no damage is caused if the boom inadvertently strikes a stationary object.

21. A portable, high sensitivity gas leak detection system comprising:
means including a plurality of pendant tubes having their open ends substantially aligned for continuously sampling air close to the surface of the earth;
said manifold means being in binary manifold configuration including means for attaching at least 16 pendant flexible tubes, means for connecting pairs of said tubes to a common conduit, and for connecting pairs of said common conduits together to provide identical path links from said tubes through said manifold.

* * * * *